(12) United States Patent
Broutin Farah et al.

(10) Patent No.: US 10,136,592 B2
(45) Date of Patent: Nov. 27, 2018

(54) METHODS AND APPARATUS FOR A HYBRID DISTRIBUTED HYDROCULTURE SYSTEM

(71) Applicant: SproutsIO, Inc., Cambridge, MA (US)

(72) Inventors: Jennifer Broutin Farah, Cambridge, MA (US); Kamal Farah, Cambridge, MA (US)

(73) Assignee: SproutsIO, Inc., Cambridge, MA (US)

( * ) Notice: Subject to any disclaimer, the term of this patent is extended or adjusted under 35 U.S.C. 154(b) by 320 days.

(21) Appl. No.: 14/693,179

(22) Filed: Apr. 22, 2015

(65) Prior Publication Data

US 2015/0305258 A1    Oct. 29, 2015

Related U.S. Application Data

(60) Provisional application No. 61/983,212, filed on Apr. 23, 2014.

(51) Int. Cl.
*A01G 31/02* (2006.01)
*A01G 31/00* (2018.01)
(Continued)

(52) U.S. Cl.
CPC .............. *A01G 31/00* (2013.01); *A01G 7/06* (2013.01); *A01G 22/00* (2018.02); *A01G 31/02* (2013.01); *G05B 11/01* (2013.01); *Y02P 60/216* (2015.11)

(58) Field of Classification Search
CPC .......... A01G 31/00; A01G 1/001; A01G 7/06; A01G 31/02; G05B 11/01; Y02P 60/216
(Continued)

(56) References Cited

U.S. PATENT DOCUMENTS 4,813,176 A * 3/1989 Takayasu .............. A01G 31/02
                                                    47/59 R
2003/0005626 A1 1/2003 Yoneda et al.
(Continued)

FOREIGN PATENT DOCUMENTS

WO    WO-2008068699 A1    6/2008

OTHER PUBLICATIONS

International Search Report and Written Opinion issued by the European Patent Office as International Searching Authority for International Application No. PCT/US2015/027085 dated Aug. 14, 2015 (14 pgs.).

*Primary Examiner* — Kenneth M Lo
*Assistant Examiner* — Michael W Choi
(74) *Attorney, Agent, or Firm* — Wilmer Cutler Pickering Hale and Dorr LLP

(57) ABSTRACT

Described herein are techniques for a hybrid distributed hydroculture system. A set of growing profiles is stored, wherein each growing profile defines a set of growing parameters for a type of plant. Data is received that is indicative of a growing profile being associated with a plant growing unit in communication with the computing device. A set of growing parameters is transmitted from the growing profile to the plant growing unit so that the plant growing unit can execute the growing parameters to grow a plant that is planted in the plant growing unit. Sensor data is received from the plant growing unit indicative of data from one or more sensors locally installed at the plant growing unit. The set of growing parameters is customized based on the sensor data from the plant growing unit to customize the parameters for the plant environment.

20 Claims, 7 Drawing Sheets

(51) Int. Cl.
    *A01G 22/00*     (2018.01)
    *G05B 11/01*     (2006.01)
    *A01G 7/06*     (2006.01)

(58) Field of Classification Search
    USPC .......................................................... 700/90
    See application file for complete search history.

(56) References Cited

U.S. PATENT DOCUMENTS

| | | | |
|---|---|---|---|
| 2008/0140431 A1* | 6/2008 | Anderson | A01B 79/005 701/50 |
| 2008/0155894 A1* | 7/2008 | Bissonnette | A01C 1/04 47/57.6 |
| 2011/0120002 A1* | 5/2011 | Pettibone | A01G 31/042 47/65 |
| 2013/0006401 A1* | 1/2013 | Shan | A01G 1/00 700/90 |
| 2014/0026474 A1* | 1/2014 | Kulas | A01G 9/02 47/1.7 |
| 2015/0000190 A1* | 1/2015 | Gibbons | A01G 27/005 47/66.6 |
| 2015/0007495 A1* | 1/2015 | Tseng | A01G 9/24 47/17 |
| 2015/0296727 A1* | 10/2015 | Posthumus | A01G 31/042 47/61 |

\* cited by examiner

METHODS AND APPARATUS FOR A HYBRID DISTRIBUTED HYDROCULTURE SYSTEM

RELATED APPLICATIONS

This application relates to and claims priority under 35 U.S.C. § 119(e) to U.S. Provisional Patent Application No. 61/983,212, titled "Methods and apparatus for a hybrid distributed hydroculture system," which was filed on Apr. 23, 2014 and is hereby incorporated by reference herein in its entirety.

BACKGROUND

Hydroculture is a method of cultivating plants in a soilless medium through aquatic distribution of water and nutrients. At first, hydroculture was a methodology primarily used for growing plants in lab, allowing scientists to target specific attributes, like nutrients, for testing. With the development of Controlled Environmental Agriculture (CEA) and indoor growing, hydroculture became more frequently used outside of the lab. There are two main types of hydroculture: hydroponic and aeroponic.

Hydroponics delivers nutrients and hydration to plant roots while submerged in water and dissolved nutrients. Support material is used at the base of the plant and sometimes at the roots to hold the plant upright.

Aeroponics employs misters positioned to spray the roots of the plants with nutrient solution, without the use of aggregate medium, such as soil, around the roots. Support material is used at the base of the plant, and the roots are enclosed in the misted chamber, while the canopy of the plant is left open.

SUMMARY

The techniques described herein can be used to optimize plant growth and resiliency in hyrdoculture. In some examples, the techniques provide for a distributed system that includes modular growing chambers with dedicated reservoirs and electronics that isolate the root area of each growing chamber, e.g., to contain the spread of disease and mitigate the risk of crop failure in a controlled environment. In some examples, the techniques provide for hybrid hydroculture, including a hybrid hydroculture system that utilizes hydroponics typical during early stage plant growth, hybrid typical during mid stage plant growth, and/or aeroponics typical during mature stage plant growth. In some examples, the techniques provide for networked controls and cloud based communication protocols that enable general system management and independent manipulation of the modular growing chambers in a distributed system. In some examples, the techniques provide for growing profiles for plant and the development of growing algorithm based on plant species and dedicated system attributes. In some examples, the techniques provide for a customizable seed cartridge based on plant type and growth stage.

Disclosed subject matter includes, in one aspect, a computerized method for automatically controlling a set of growing parameters for each of a set of plant growing units, wherein the set of growing parameters for each plant growing unit from the set of plant growing units are customized based on both an environment in which the plant growing unit is located and a type of plant being grown in the plant growing unit. The computerized method includes storing, by a computing device, a set of growing profiles in a database in communication with the computing device, wherein each growing profile defines a set of growing parameters for a type of plant. The computerized method includes receiving, by the computing device, data indicative of a growing profile from the set of growing profiles being associated with a plant growing unit from a set of plant growing units in communication with the computing device. The computerized method includes transmitting, by the computing device, a set of growing parameters from the growing profile to the plant growing unit so that the plant growing unit can execute the growing parameters to grow a plant that is planted in the plant growing unit. The computerized method includes receiving, by the computing device, sensor data from the plant growing unit indicative of data from one or more sensors locally installed at the plant growing unit. The computerized method includes customizing, by the computing device, the set of growing parameters based on the sensor data from the plant growing unit such that the set of growing parameters can be customized for an environment in which the plant growing unit is located.

Disclosed subject matter includes, in another aspect, a computing system for automatically controlling a set of growing parameters for each of a set of plant growing units, wherein the set of growing parameters for each plant growing unit from the set of plant growing units are customized based on both an environment in which the plant growing unit is located and a type of plant being grown in the plant growing unit. The computing system includes a processor configured to run a module stored in memory that is configured to cause the processor to store a set of growing profiles in a database in communication with the computing system, wherein each growing profile defines a set of growing parameters for a type of plant. The module stored in memory is further configured to cause the processor to receive data indicative of a growing profile from the set of growing profiles being associated with a plant growing unit from a set of plant growing units in communication with the computing device. The module stored in memory is further configured to cause the processor to transmit a set of growing parameters from the growing profile to the plant growing unit so that the plant growing unit can execute the growing parameters to grow a plant that is planted in the plant growing unit. The module stored in memory is further configured to cause the processor to receive sensor data from the plant growing unit indicative of data from one or more sensors locally installed at the plant growing unit. The module stored in memory is further configured to cause the processor to customize the set of growing parameters based on the sensor data from the plant growing unit such that the set of growing parameters can be customized for an environment in which the plant growing unit is located.

Disclosed subject matter includes, in another aspect, a non-transitory computer readable medium comprising executable instructions operable to cause an apparatus to store a set of growing profiles in a database, wherein each growing profile defines a set of growing parameters for a type of plant. The executable instructions are operable to cause an apparatus to receive data indicative of a growing profile from the set of growing profiles being associated with a plant growing unit from a set of plant growing units in communication with the computing device. The executable instructions are operable to cause an apparatus to transmit a set of growing parameters from the growing profile to the plant growing unit so that the plant growing unit can execute the growing parameters to grow a plant that is planted in the plant growing unit. The executable instructions are operable to cause an apparatus to receive sensor data from the plant growing unit indicative of data from one or more sensors locally installed at the plant growing unit. The executable instructions are operable to cause an apparatus to customize the set of growing parameters based on the sensor data from the plant growing unit such that the set of growing parameters can be customized for an environment in which the plant growing unit is located.

These and other capabilities of the disclosed subject matter will be more fully understood after a review of the following figures and detailed description. It is to be understood that the phraseology and terminology employed herein are for the purpose of description and should not be regarded as limiting.

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Distributed System

The distributed system described herein can allow for multiple plant types to be grown within one system, while at the same time limiting the spread of disease, reducing failure and allowing for adaptability of the system in multiple configurations. This is made possible through the networked capability of the system for remote control and monitoring.

Figure 1:
FIG. 1 is an exemplary diagram of a hybrid distributed hydroculture system in accordance with some embodiments.

FIG. 1 is an exemplary diagram of a hybrid distributed hydroculture system in accordance with some embodiments. As shown in FIG. 1, each "unit" 100 includes an associated plant type and can be placed alone or with multiple units called a "set" 101 within a room. FIG. 1 shows a single unit and a set with three units. The current embodiment is primarily constructed of plastic, aluminum and urethane. The unit is described in further detail with respect to FIGS. 3 and 4, and the communication among different units or sets is described in further detail with respect to FIG. 5.

Figure 2:
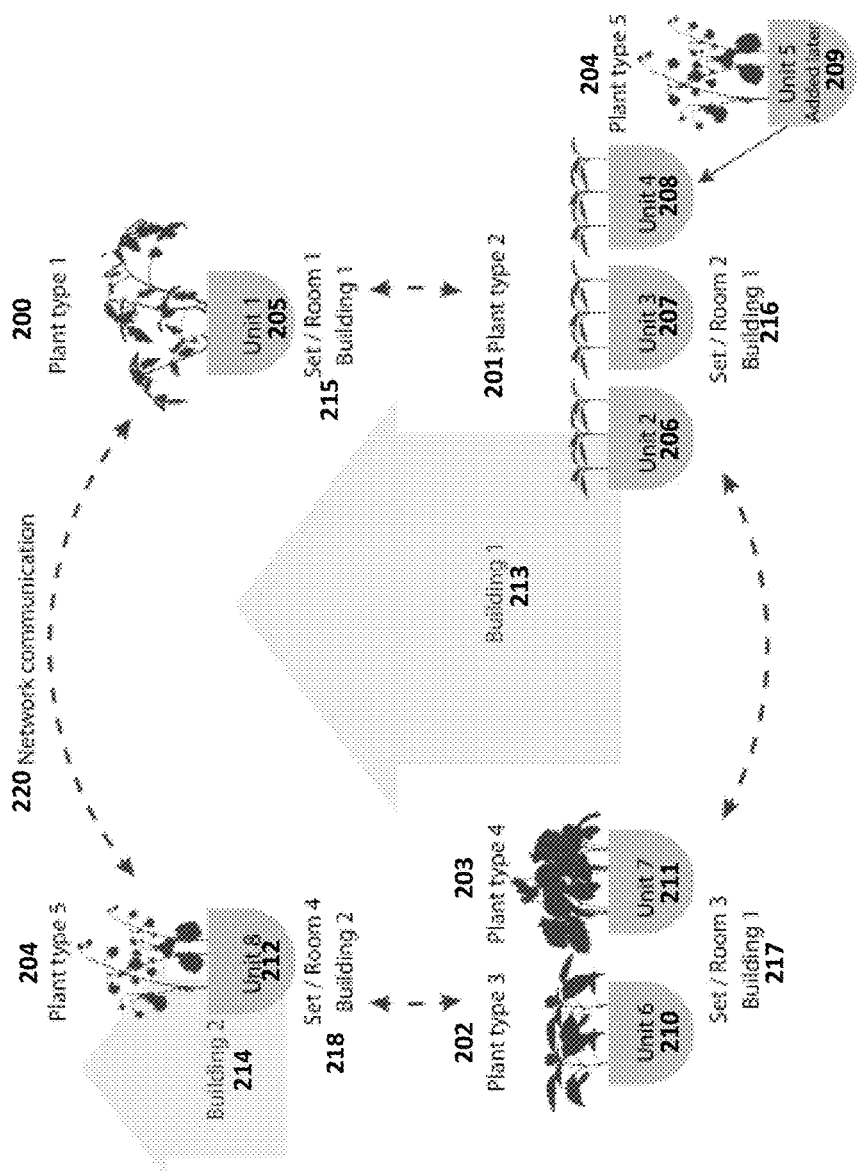
FIG. 2 is an exemplary diagram of a hybrid distributed hydroculture system in different rooms and/or buildings in accordance with some embodiments.

FIG. 2 is an exemplary diagram of a hybrid distributed hydroculture system in different rooms and buildings in accordance with some embodiments. The scenario in FIG. 2 shows eight units and four sets for one "system" within two buildings. The first set/room 215 includes a single unit 205 with a plant type 200. The second set/room 216 includes three units 206-208, all with the same plant type 201, an additional unit 209 is added at a later point with a different plant type 204. The third set/room 217 has two units 210-211, each with a different plant type 202-203. The first three sets/rooms are all in the first building 213. The fourth set/room 218 includes a single unit 212 with a plant type 204 in another building 214. However, one of skill in the art can appreciate that there can be myriad units and sets within multiple buildings as necessary within one system. Each unit can grow one or complementary plant type(s) at a time with multiple plants as the size accommodates. The plant type(s) can then be removed from the unit and a different plant type(s) can be placed. Additionally, units or sets can be added to the system at any point to expand the system, as shown by the addition of unit five 209 with plant type five 204 to the set in room two 216.

Each unit is designed to function in a number of different configurations, including autonomously, within a set, within a system, or any combination thereof. The system is not restricted by space or distance. For example, unit three 207 in building one 213 is part of the same system 219 as unit eight 212 in building two 214, even if they are very far away from one another.

Figure 3:
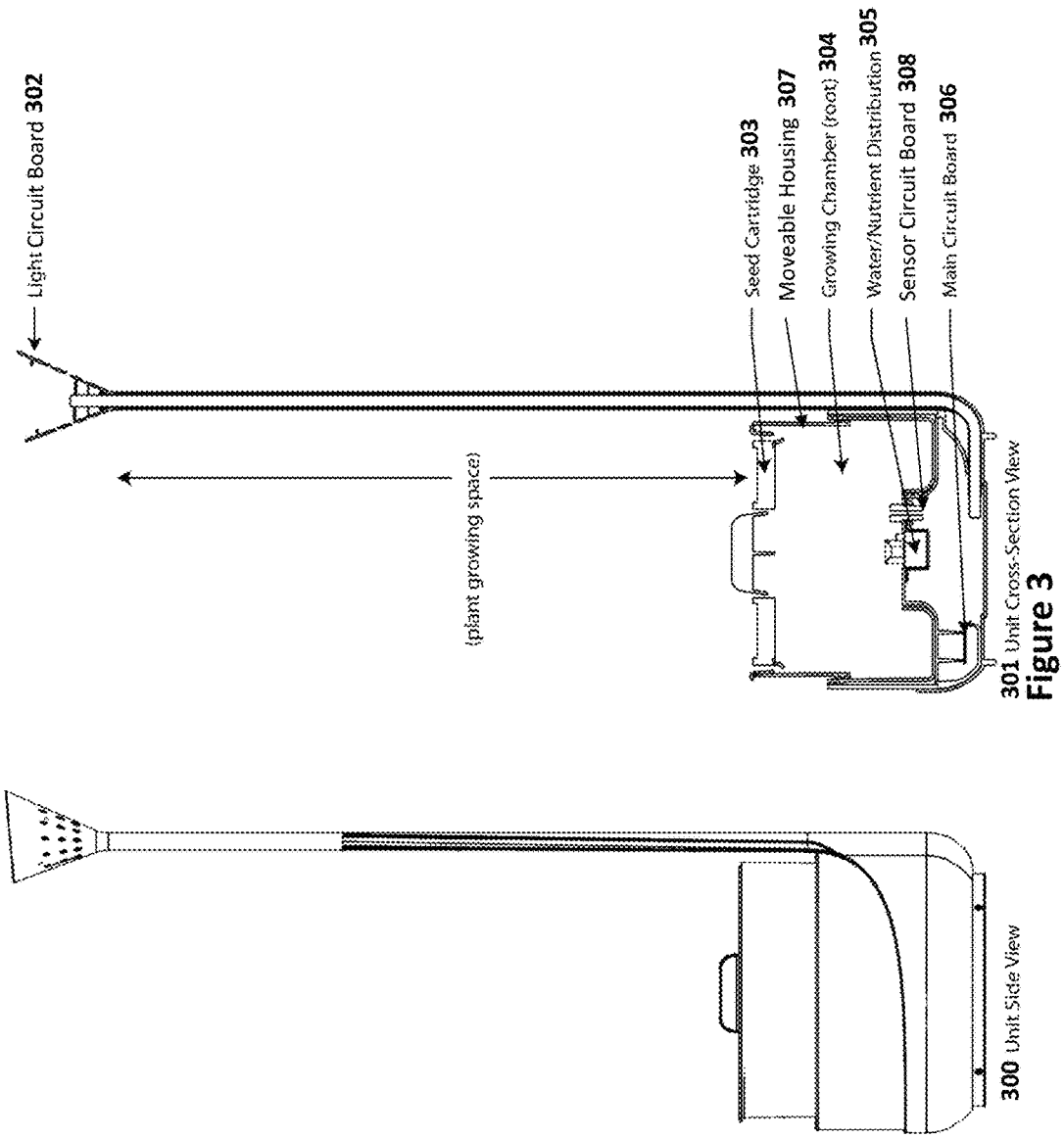
FIG. 3 is an exemplary diagram of a hydroculture unit in accordance with some embodiments.

FIG. 3 is an exemplary diagram of a hydroculture unit in accordance with some embodiments. As illustrated in FIG. 3, the unit is comprised of: water/nutrient distribution 305 (electronic mister, pump), growing chamber 304 (dedicated reservoir, expandable housing, sensor circuit board), seed cartridge 303 (with seeds, seed substrate, structure, growing medium, nutrients), light 302 (LED board, heatsink, fan), main circuit board 306 (microcontroller, network capability). In some examples, the main, sensor and light boards may be combined into one or more components. For example, the light/LED circuit board may be incorporated into the main circuit board. These components may be moved or recombined in order to improve their effectiveness. For example, a sensor may achieve better readings if placed in one area rather than another.

The unit includes a water/nutrient distribution 305 component that distributes water and nutrients to the plant. The water/nutrient distribution 305 component can be an electronic mister that includes an ultrasonic diaphragm on the top that produces droplets larger than 5 microns. These droplets create a fog-like water/nutrient vapor that can be absorbed by the plant roots. The vapor is largely contained within the growing chamber 304 and recirculates for water/nutrient conservation. The water/nutrient distribution 305 component can include a pump to aerate and/or circulate the water in the growing chamber 304. The electronic mister and the pump is connected to the main circuit board 306.

The unit includes a growing chamber 304 with a reservoir at the base where water/nutrient solution is stored. The roots of the plant are supported at the top of the growing chamber 304 in the seed cartridge 303 and hang inside of the growing chamber 304 where they are in contact with the water/nutrient solution or vapor from the reservoir.

The growing chamber 304 incorporates a "moveable housing" 307 that allows for the chamber to expand to provide more growing area for plant roots and change from a hydroponic to aeroponic system. The growing chamber 304 also includes a sensor circuit board 308 that monitors the conditions at the root. The sensor circuit board includes humidity, temperature, pH and conductivity sensors presently. The sensor circuit board 308 is connected to the main circuit board 306.

The seed cartridge 303 is an attachment onto the growing chamber 304 and moveable housing 307. The seed cartridge 303 is made of a plastic support with seeds, seed substrate, structure, growing medium, and nutrients specific to plant type. The seed cartridge 303 can be planted, removed and replaced from the system and it is also interchangeable. For example, a strawberry seed cartridge could be placed into unit one and then moved into unit two; a tomato seed cartridge could then be placed into unit one.

The light circuit board 302 includes high efficiency LED's that have different colors and intensity as needed for the plants growing within the unit. The light circuit board 302 currently incorporates a light sensor and camera for recording images of the plants and monitoring lighting conditions. The light circuit board 302 incorporates a microprocessor that is connected to the main circuit board 306.

The main circuit board 306 is the main control and information hub of the unit. It can include power regulation. As described further in FIG. 3, the main circuit board 306 determines whether the unit is a master or a slave. The slave board incorporates a microprocessor that can be Bluetooth (BLE) enabled to communicate with other devices. The slave board also incorporates parts that allow all of the ancillary components (light, sensor, mister) to connect to it. The master board has all of the same components as the slave, in addition to a microprocessor that is Wifi or Ethernet enabled to communicate to the internet and cloud database.

The distributed design of the system can, for example, contain spread, e.g., the distributed growing/reservoir chambers contain the spread of disease at the root, which can be a devastating problem. The distributed growing/reservoir chambers can provide for the ability to space between plant types as needed, which aids in minimizing pests. The distributed design of the system can, for example, provide for co-locating the growing chamber and reservoir, which can conserve water and nutrient use, minimize waste, and/or the like. The system can be configured line-free and nozzleless, such that clogged or mildew ridden nozzles and water throughways are no longer an issue as they are no longer necessary using an electronic mister. The distributed design of the system can, for example, minimize failure since multi-source misting with electronic ultrasonic misters mitigates failures in the system, unlike standard single source misting with mechanical pumps. For example, if one electronic mister malfunctions, the rest of the units in the system will continue to function because each unit has an associated ultrasonic mister.

Hybrid Hydroculture

Plants, depending on variety and stage of plant growth, have different needs. Early stage plants often prefer hydroponic cultivation, as they require more moisture and less oxygen at the root. As plants continue to grow, they often prefer aeroponic cultivation more exposure to oxygen and less to moisture at the root. The hybrid hydroculture system herein described can accommodate this change from hydro to a mixed hydro/aero hybrid to aero growing by changing from collapsed to extended growing chambers and varying the amount of solution within the growing chamber.

Figure 4:
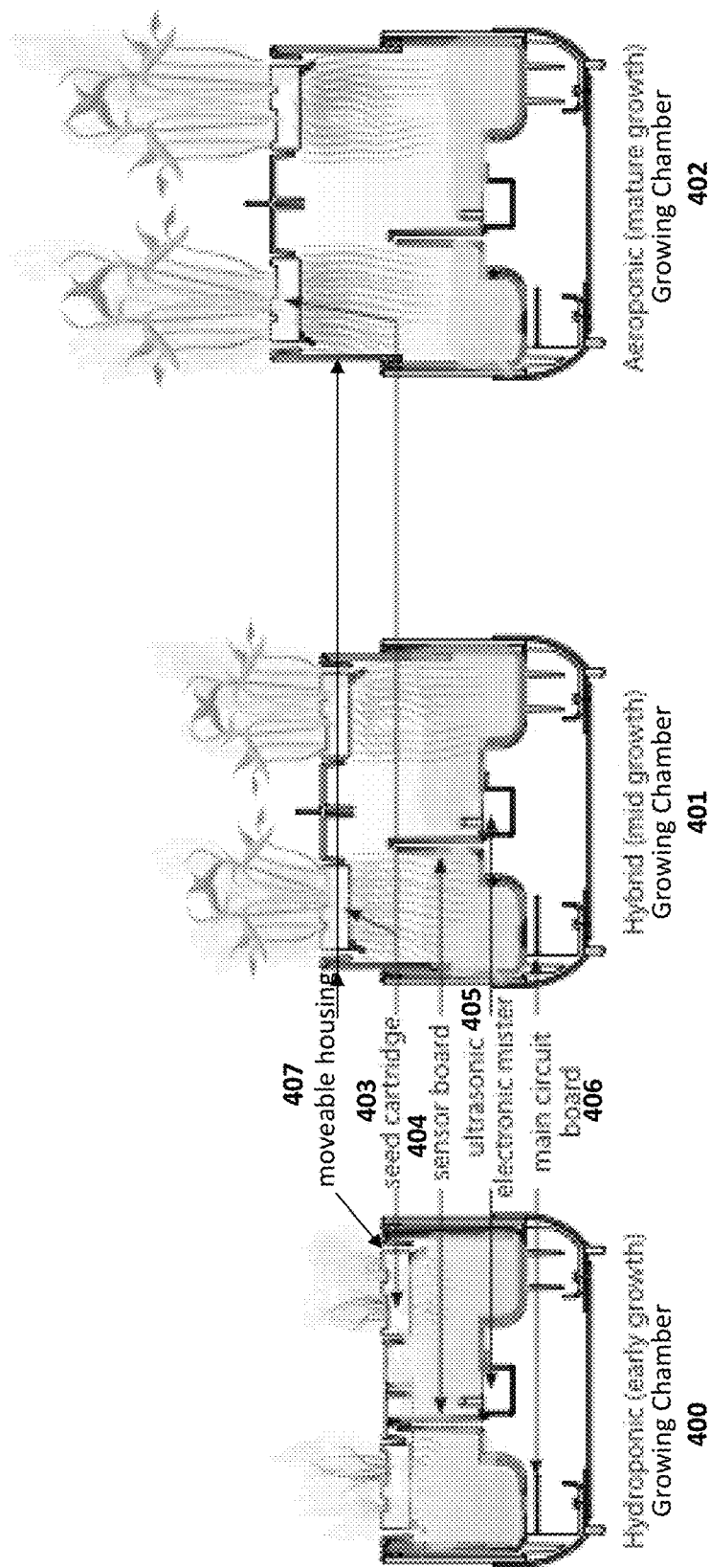
FIG. 4 is an exemplary diagram of how a unit can be adjusted to achieve hydroponic, hybrid and/or aeroponic applications in accordance with some embodiments.

FIG. 4 is an exemplary diagram of how a units' growing chamber can be adjusted to achieve hydroponic 400, hybrid 401 and/or aeroponic 402 applications in accordance with some embodiments. The unit includes the seed cartridge 403, growing chamber with sensor circuit board 404 and ultrasonic mister 405, and main circuit board 406 as detailed in FIG. 3. The hydroponic configuration 400 is achieved by lowering the area of the seed cartridge 403 so that the roots and cartridge are fully submerged in the solution. The solution level is higher within the growing chamber in the hydroponic state. The aeroponic configuration 402 of the unit is achieved by lifting the seed cartridge area so the roots have more growing room and are exposed to the vapor created from the ultrasonic mister. The solution level is lower within the growing chamber in the aeroponic state. There are varying degrees of hydro/aero (hybrid) state that can occur during the growth process, depending on length of the roots, and how far the moveable growing chamber is extended and the solution level of the growing chamber. The hybrid configuration 401 of the unit is achieved by lifting the seed cartridge area so the roots are partially submerged in water, and partially exposed to the vapor created from the ultrasonic mister. In some embodiments, the user lifts or lowers the moveable housing 407 into place manually. In some embodiments, the moveable housing 407 can be raised and/or lowered automatically.

The hybrid system uses an electronic ultrasonic mister 405 to provide mist particles over 5 microns for sufficient water and nutrient uptake at the root in the aeroponic state. This ultrasonic mister 405 is also in use during the hydroponic state to perturb the water and nutrient mix so that the water does not stagnate (important to keep bacteria and disease from forming at the root) and the nutrients and water are mixed as a solution.

As shown in FIG. 4, the system can be configured to achieve different ways of moving from aeroponic into hydroponic growing environments (e.g., depending how much water is at the base of the system, and/or by moving the seed portion upwards in the system to give more space to the roots of the system). The hybrid design of the system can allow for advances in optimizing soil-free growing. The techniques can provide for optimized plant growth by cycle. For example, the techniques can optimize plant growth at different stages of the plant cycle by utilizing hydroponics, hydro/aero and aeroponics within one system without needing to use separate units. The techniques can optimize plant growth by varietal. For example, varietals can be affected differently by growth in hydroponics, hydro/aero and aeroponics.

Networked Unit Management Protocol

Networked control and monitoring of a distributed system can be used in order to limit repetitive tasks that would otherwise become inhibitive (such as turning on and off misters on a continual basis). This networked capability can be grouped to control and monitor one or multiple units within the system at one time. For example, units one, two and three are all growing tomatoes and were planted at the same time—the user can control all three units with the same attributes, rather than controlling each individually. Additionally, continuously updated data on system use and plant growth can be recorded for feedback and improvement.

Figure 5:
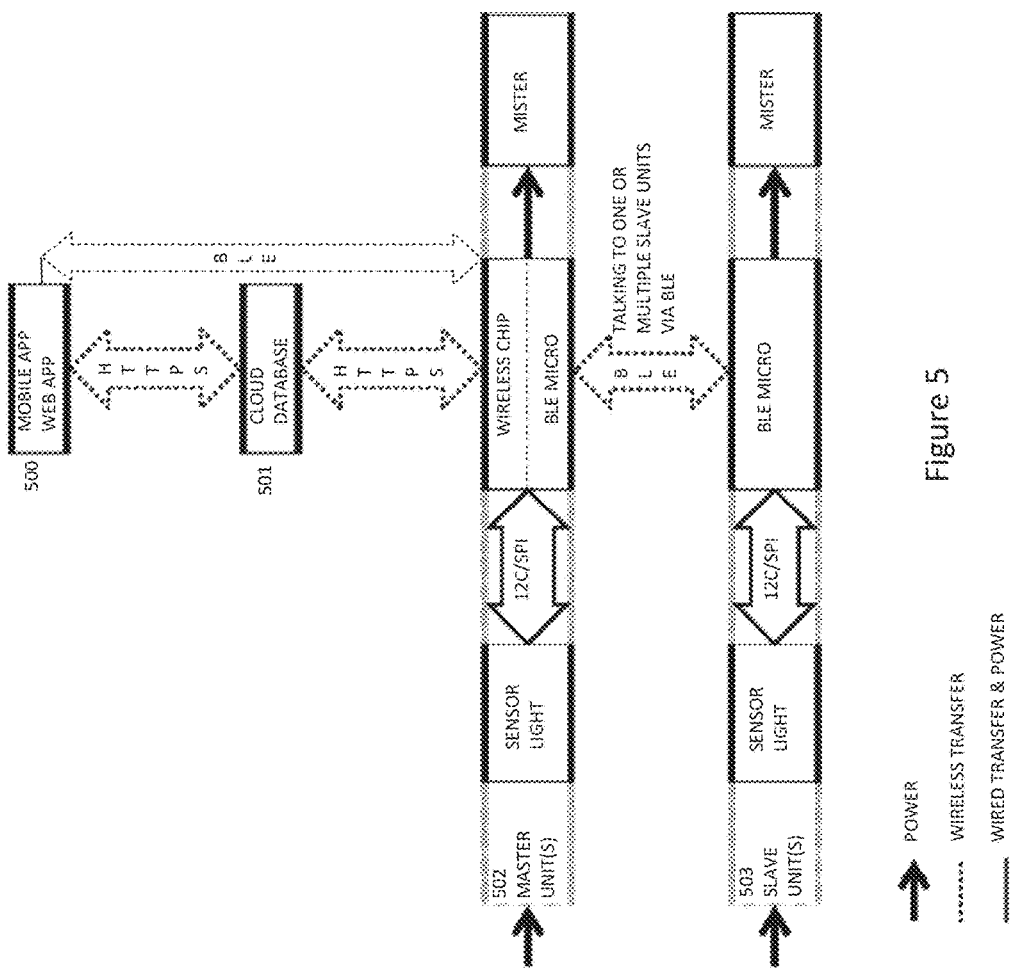
FIG. 5 is an exemplary diagram of a system protocol in accordance with some embodiments.

FIG. 5 is an exemplary diagram of the system protocol in accordance with some embodiments. The mobile/web application 500 can function on myriad devices and operating systems including Android, iOS, Windows, OS, Linux. The mobile/web application 500 has functionality to control (lighting and misting on schedule) and also monitor (via the sensor data over time) the units and system.

The system protocol illustrated in FIG. 5 is based on a "master" unit 502 and multiple "slave" units 503. The slave unit 503 can incorporate a sensor circuit board (e.g., temperature, pH, humidity, and/or conductivity), a light circuit board (e.g., LED's, light sensor and camera) a Bluetooth (BLE, Bluetooth low energy) microcontroller, and a mister in its current embodiment. The master unit incorporates the same components with the addition of a wireless or Ethernet enabled chip for network communication to the internet and cloud database.

The master unit serves as an entry and exit gate for information transmitted to the cloud server, which includes a database 501 to store information received from the master unit 502. Each slave unit communicates with a designated master unit 502 to transmit its data to the cloud database 501. Information flows in the opposite direction when commands from a controller such as a mobile/web application 500 are sent to the cloud database 501, then to the master unit 502 and then forwarded on to the appropriate slave unit(s), as necessary. The mobile application/web application 500 can send commands and receive information via Bluetooth (BLE) to a designated master unit directly as well.

It is possible to have multiple master units 502 communicate to the cloud database 501 with or without slave units 503. It is possible to have multiple slave 503 units communicate to a designated master unit 502 that then communicates to the cloud database 501. It is not possible to have slave units 503 communicate to the cloud database 501 without a master unit 502.

The network protocol of the system provides for, for example, automation and data communication between units, sets and systems. The techniques provide an ability to control the system(s) from anywhere, such that the user does not need to be in proximity to the system. The system can provide tiered control, such as by providing the ability to control one unit, a set of units, or on an entire system basis. The techniques provide for data analytics, including setting up a protocol for recording plant growing and system history for analysis.

In some examples, the mobile application/web application 500 can configure a particular growing profile, which is explained in further detail herein, for each unit (e.g., master unit 502 or slave unit 503). The cloud database 501 (e.g., hosted by a cloud server, not shown) stores the growing profiles for each of the units 502 or 503. The growing profile can be used to configure growing settings that are transmitted (e.g., via wireless transmission (e.g., 802.11), Bluetooth, etc.) to each of the units 502 or 503. The units 502 or 503 receive the growing settings and can execute the growing settings (e.g., lighting, misting, fan, and/or the like). The cloud database 501 can also customize the settings based on data indicative of the particular environment of the units 502 or 503 (e.g., temperature, humidity, light and/or the like), as explained further herein.

Growing Profiles

Growing profiles 605 are analytics associated with a particular plant type based on optimal growing conditions within the system. As explained further herein, growing profiles 605 can be used to configure particular growing settings for a plant type. Additionally, the techniques described herein can be configured to also take into account the individual environment for each growing chamber to customize the growing profiles for the specific environment (e.g., a tomato species growing indoors in a dry/cold climate may have very different configurations than the same tomato species growing outdoors in a warm/humid climate, even though the underlying growing profile configuration for the tomato species is the same).

Figure 6:
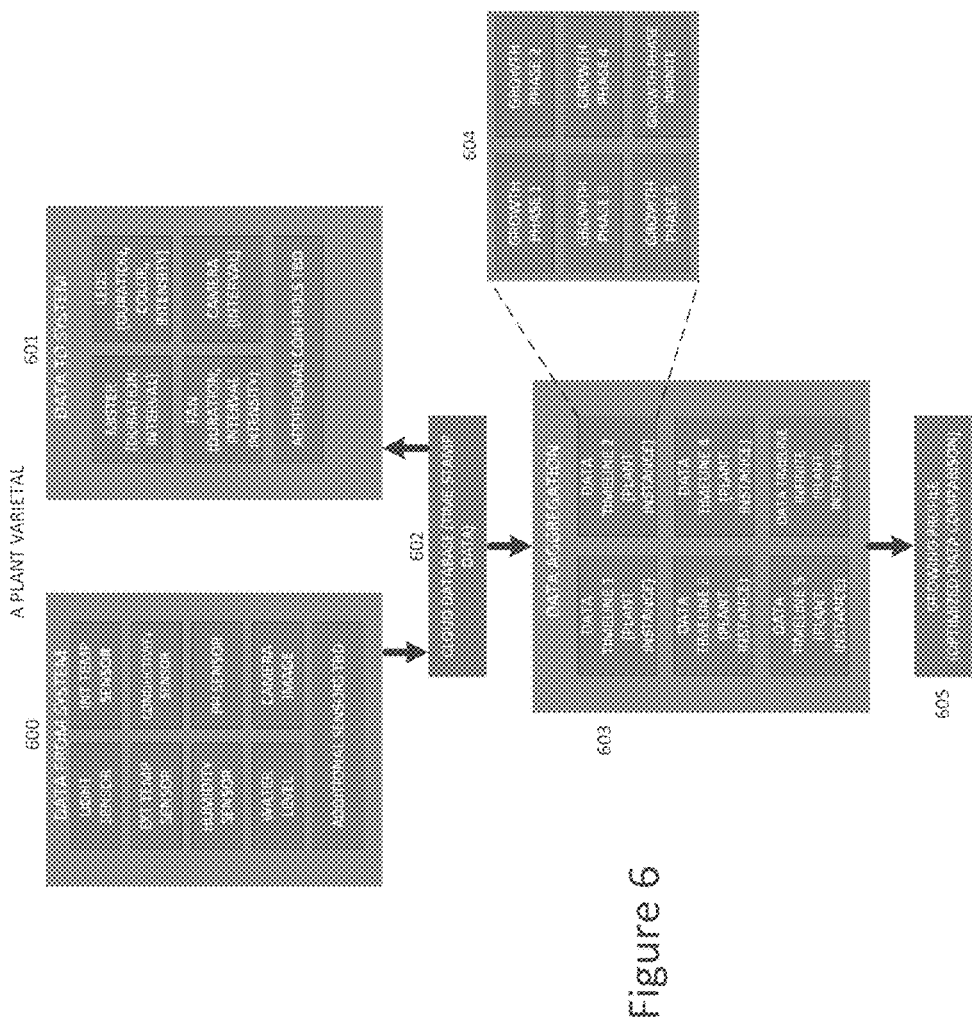
FIG. 6 is an exemplary diagram of a growing protocol in accordance with some embodiments.

FIG. 6 is an exemplary diagram of a growing profile protocol in accordance with some embodiments. Data from the system 600 indicates data transmitted to the cloud database from one or more units. Data to the system 602 indicates data (e.g., configuration data) transmitted to the one or more units.

In some examples, data from the system 600 can include data from a light sensor, an internal temperature sensor, an external temperature sensor, a pH sensor, a humidity sensor, a conductivity sensor, a camera, and/or any other sensor. The light sensor data can include values for the color and intensity of the light. The internal temperature sensor data can include the internal temperature of the growing chamber at the root area. The external temperature sensor can include the temperature of the plant at the stem/leaves. The pH sensor can include the pH of the solution in the growing chamber at the root area. The humidity sensor can include humidity of the growing chamber at the roots of the plant. The conductivity sensor can include the parts per million (ppm) of nutrients in the solution within the growing chamber in the reservoir area. The camera can include images of the plant from above.

In some examples, data to the system 601 can include misting, camera, fan, light control, and/or any other type of data. Misting can be controlled in terms of duration and interval of mist, and can be set on a calendar schedule. For example: Mist for two minutes every hour on Tuesdays, and mist for 5 minutes every hour on Saturdays. The camera can be controlled in terms of frequency, and can be set on a calendar schedule. The fan can be controlled in terms of duration, interval, intensity and all can be coordinated with a calendar schedule. Lighting can be controlled in terms of color, intensity, and duration, as well as being set on a calendar schedule. For example, the system can be configured to control different spectrums of lighting and lighting intensity (e.g., the system can be configured to provide more bluish light when the plant is younger compared to more reddish light when the plant is more mature). Misting, imaging, fanning and lighting controls can be set for a unit 206, a set 216 or on the whole system 219.

Following is an example of how the growing profile 605 would be implemented. Strawberry plants are planted in a unit. The user can tell the system via the controller (mobile/web application) that this plant has been installed. A preloaded "strawberry" growing profile 605 is associated with the plant that includes sensor data from system 600 (light, temperature, humidity, pH, etc.) and automation schedule pertinent to "strawberry" growing to system 601 for optimal strawberry plant growing. This "strawberry" growing profile 605 establishes a baseline for growing, however it is possible for the profile to be updated and optimized by receiving data/commands from users 500 (via the mobile/web app) and data from environmental conditions and occurrences of plant growing in system to the cloud database/server 602. This has created an instance of the "strawberry" growing profile 603 (e.g. "strawberry 1"), and can be one of many different instances 603 of the "strawberry" growing profile. It is even possible to create instances of a subset of this "strawberry" growing profile for each growth phase (e.g. seedling, mature) 604 to optimize plant growth. For example, a subset of the "strawberry" growing profile can be "strawberry 1, seedling 1". All of these instances in plant growth 603 and growth phase 604 can be saved and aggregated in the cloud server/database 602 to be utilized toward optimizing the "strawberry" growing profile. The more plants are grown within the system (plant instances 603 and growth phase instances 604), the more intelligent the growing profiles 605 become. In this manner the system will use machine learning to make the growing profiles 605 and become more robust and refined through use.

As another illustrative example of how a growing profile can be modified, assume a type of pepper is being grown in the northeastern US (e.g., Massachusetts) during the summer, and it is located indoors near the window so it is getting natural light. The techniques described herein can be configured to automatically adjust the lighting to give the proper amount of light necessary for the pepper based on light sensor feedback (e.g., since the peppers are receiving some natural light). If the same type of pepper is being grown in South America (e.g., at the same time of year, but it is the winter in the southern hemisphere) and the pepper is getting an entirely different amount/type of light (e.g., since the plant is located in a windowless corner), then the techniques described herein can augment the amount of administered light so that more artificial light is provided than would be provided had the system been located near a window.

As one of skill can appreciate, even though the type of plant may be the same, each growing environment may be different and the system can be configured to accommodate those differences (e.g., using lighting, misting, fans, and/or the like.

The benefits of growing profiles 605 can include control and customization and/or profile optimization. For example, an ideal and customized growing environment for multiple plant types can be maintained simultaneously within one system. As another example, growing profiles can assist users in growing plants according to metrics established for each plant type. As another example, profiles can be constantly updated via updates from users—more users create finer tuned data for profiles, learning over time.

Seed Cartridge

The seed cartridge 700 serves as the primary means of providing support, structure and nutrients for myriad types of plants at different growth stages.

Figure 7:
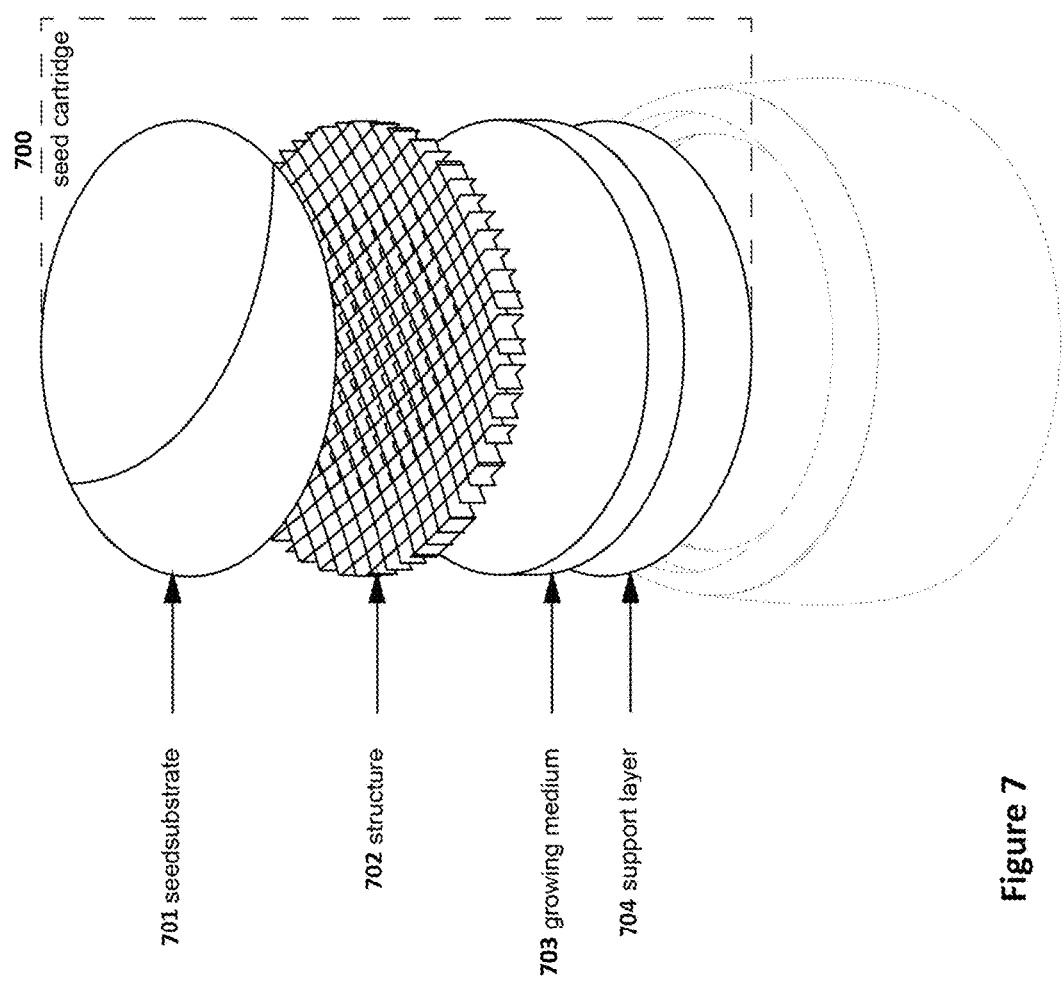
FIG. 7 is an exemplary diagram of a seed cartridge 700 assembly in accordance with some embodiments.

FIG. 7 is an exemplary diagram of a seed cartridge 700 assembly in accordance with some embodiments. The seed substrate 701 provides the layer in which seeds are embedded into the seed cartridge. In some examples this is made of paper and/or any other type of suitable material. The structure 702 provides support for the roots of the plants and can be made to varying thickness and density in order to support large plants with dense, deep root structure (e.g. tomato) to small plants with loose, shallow root structure (e.g. wheatgrass). In some examples this is made of plastic and/or any other type of suitable material. The growing medium 703 provides support, moisture and nutrients at the roots and base of stem through capillary action. In some examples this is made of wool, cotton, felt, peat and/or any other type of suitable material. The support layer 704 can be used to provide additional support to the plants as needed depending on plant type and growth phase. In some examples this is made of wool, cotton, peat and/or any other type of suitable material. These layers can be mixed, matched or multiplied and sandwiched together to make the best seed cartridge for a particular plant type and growth stage, and will be customized as such to optimize plant growth. Nutrients will be added to layers for time release distribution based on plant type and growth phase.

The seed cartridge 700 is transportable and adaptable. It can be added to a unit, removed and then replanted in another unit. It can be added to a unit, removed, and replanted in soil for outdoor growing. In some embodiments, the natural materials, nutrients and layering techniques are designed to last for a given period of time necessary for that particular plant growth and once completed they will disintegrate or can be composted.

The benefits of the seed cartridge 700 can include growth optimization, standardization, and/or interchangeability. For example, the seed cartridge can provide an ideal and customized growing substrate and nutrients for different plant types at different growth stages. As another example, the seed cartridge can provide the ability to maintain optimum growing conditions for different types of plants across multiple seed cartridges 700, reducing the risk of seeds not germinating. As another example, the seed cartridge can be moved from one unit to another throughout growth process, and can be transplanted into soil if desired.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computerized method for improving plant growth comprising:
    storing, by a computing device, a set of growing profiles in a database in communication with the computing device, wherein each growing profile of the set of growing profiles defines a set of growing parameters for a type of plant;
    receiving, by the computing device, data indicative of a first growing profile from the set of growing profiles, wherein the first growing profile is associated with a first plant growing unit from a set of plant growing units in communication with the computing device;
    transmitting, by the computing device, a first set of growing parameters from the first growing profile to the first plant growing unit so that the first plant growing unit can execute the first set of growing parameters to grow a plant that is planted in the first plant growing unit;
    receiving, by the computing device, first sensor data from the first plant growing unit indicative of data from one or more sensors locally installed at the first plant growing unit;
    customizing, by the computing device, the first set of growing parameters based on the first sensor data from the first plant growing unit such that the first set of growing parameters is customized for a first environment in which the first plant growing unit is located, wherein the customizing comprises machine learning that aggregates environmental condition data that is associated with the first growing profile from a plurality of additional plant growing units and optimizes the first growing profile for the first environment; and
    controlling a hardware component associated with the first plant growing unit using the customized first set of growing parameters,
    wherein the controlling is configured to transition the first plant growing unit between a hydroponic configuration, a hybrid hydroponic and aeroponic configuration, and an aeroponic configuration in accordance with the customized first set of growing parameters,
    wherein a seed cartridge of the first plant growing unit is positioned at a first location in the hydroponic configuration, the seed cartridge is positioned at a second location in the hybrid hydroponic and aeroponic configuration, and the seed cartridge is positioned at a third location in the aeroponic configuration, wherein the first location, the second location, and the third location are different, and
    wherein the third location is vertically higher than the second location, and the second location is vertically higher than the first location.

2. The computerized method of claim 1, further comprising:
    receiving second data indicative of a second growing profile from the set of growing profiles being associated with a second plant growing unit from the set of plant growing units in communication with the computing device;
    transmitting a second set of growing parameters from the second growing profile to the second plant growing unit so that the second plant growing unit can execute the second set of growing parameters to grow a second plant that is planted in the second plant growing unit;
    receiving second sensor data from the second plant growing unit indicative of data from one or more sensors locally installed at the second plant growing unit; and
    customizing the second set of growing parameters based on the second sensor data from the second plant growing unit such that the second set of growing parameters is customized for a second environment that is different than the first environment, wherein the customizing of the second set of growing parameters optimizes the second growing profile for the second environment.

3. The computerized method of claim 1, wherein the first set of growing parameters includes one or more of:

a mister setting for a mister installed at the first plant growing unit;

a fan setting for a fan installed at the first plant growing unit; and an illumination setting for an illumination source installed at the first plant growing unit.

4. The computerized method of claim 1, wherein the first set of growing parameters includes first stage growing parameters related to a first growth stage of the plant and second stage growing parameters related to a second growth stage of the plant, wherein the first stage and second stage growing parameters are different.

5. The computerized method of claim 1, wherein the first sensor data includes one or more of the following:

illumination data regarding natural illumination at the first plant growing unit;

temperature data regarding temperature at the first plant growing unit;

humidity data regarding humidity of the first plant growing unit; and water data regarding a water level at the first plant growing unit.

6. A computing system for improving plant growth comprising a processor configured to run a module stored in memory that is configured to cause the processor to:

store a set of growing profiles in a database in communication with the computing system, wherein each growing profile of the set of growing profiles defines a set of growing parameters for a type of plant;

receive data indicative of a first growing profile from the set of growing profiles, wherein the first growing profile is associated with a first plant growing unit from a set of plant growing units in communication with the computing system;

transmit a first set of growing parameters from the first growing profile to the first plant growing unit so that the first plant growing unit can execute the first set of growing parameters to grow a plant that is planted in the first plant growing unit;

receive first sensor data from the first plant growing unit indicative of data from one or more sensors locally installed at the first plant growing unit;

customize the first set of growing parameters based on the first sensor data from the first plant growing unit such that the first set of growing parameters is customized for a first environment in which the first plant growing unit is located, wherein the customizing comprises machine learning that aggregates environmental condition data that is associated with the first growing profile from a plurality of additional plant growing units and optimizes the first growing profile for the first environment; and control a hardware component associated with the first plant growing unit using the customized first set of growing parameters, wherein the control is configured to transition the first plant growing unit between a hydroponic configuration, a hybrid hydroponic and aeroponic configuration, and an aeroponic configuration in accordance with the customized first set of growing parameters, wherein a seed cartridge of the first plant growing unit is positioned at a first location in the hydroponic configuration, the seed cartridge is positioned at a second location in the hybrid hydroponic and aeroponic configuration, and the seed cartridge is positioned at a third location in the aeroponic configuration, wherein the first location, the second location, and the third location are different, and wherein the third location is vertically higher than the second location, and the second location is vertically higher than the first location.

7. The computing system of claim 6, wherein the module stored in memory is further configured to cause the processor to:

receive second data indicative of a second growing profile from the set of growing profiles being associated with a second plant growing unit from the set of plant growing units in communication with the computing device;

transmit a second set of growing parameters from the second growing profile to the second plant growing unit so that the second plant growing unit can execute the second set of growing parameters to grow a second plant that is planted in the second plant growing unit;

receive second sensor data from the second plant growing unit indicative of data from one or more sensors locally installed at the second plant growing unit; and customize the second set of growing parameters based on the second sensor data from the second plant growing unit such that the second set of growing parameters is customized for a second environment that is different than the first environment, wherein the customizing of the second set of growing parameters optimizes the second growing profile for the second environment.

8. The computing system of claim 6, wherein the first set of growing parameters includes one or more of:

a mister setting for a mister installed at the first plant growing unit;

a fan setting for a fan installed at the first plant growing unit; and an illumination setting for an illumination source installed at the first plant growing unit.

9. The computing system of claim 6, wherein the first set of growing parameters includes first stage growing parameters related to a first growth stage of the plant and second stage growing parameters related to a second growth stage of the plant, wherein the first stage and second stage growing parameters are different.

10. The computing system of claim 6, wherein the first sensor data includes one or more of the following:

illumination data regarding natural illumination at the first plant growing unit;

temperature data regarding temperature at the first plant growing unit;

humidity data regarding humidity of the first plant growing unit; and water data regarding a water level at the first plant growing unit.

11. A non-transitory computer readable medium comprising executable instructions operable to cause an apparatus to:

store a set of growing profiles in a database, wherein each growing profile of the set of growing profiles defines a set of growing parameters for a type of plant;

receive data indicative of a first growing profile from the set of growing profiles, wherein the first growing profile is associated with a first plant growing unit from a set of plant growing units in communication with a computing device;

transmit a first set of growing parameters from the first growing profile to the first plant growing unit so that the first plant growing unit can execute the first set of growing parameters to grow a plant that is planted in the first plant growing unit;

receive first sensor data from the first plant growing unit indicative of data from one or more sensors locally installed at the first plant growing unit; and customize the first set of growing parameters based on the first sensor data from the first plant growing unit such that the first set of growing parameters is customized for a first environment in which the first plant growing unit is located, wherein the customizing comprises machine learning that aggregates environmental condition data that is associated with the first growing profile from a plurality of additional plant growing units and optimizes the first growing profile for the first environment; and control a hardware component associated with the first plant growing unit using the customized first set of growing parameters, wherein the control is configured to transition the first plant growing unit between a hydroponic configuration, a hybrid hydroponic and aeroponic configuration, and an aeroponic configuration in accordance with the customized first set of growing parameters, wherein a seed cartridge of the first plant growing unit is positioned at a first location in the hydroponic configuration, the seed cartridge is positioned at a second location in the hybrid hydroponic and aeroponic configuration, and the seed cartridge is positioned at a third location in the aeroponic configuration, wherein the first location, the second location, and the third location are different, and wherein the third location is vertically higher than the second location, and the second location is vertically higher than the first location.

12. The non-transitory computer readable medium of claim 11, wherein the executable instructions are operable to cause the apparatus to:

receive second data indicative of a second growing profile from the set of growing profiles being associated with a second plant growing unit from the set of plant growing units in communication, with the computing device;

transmit a second set of growing parameters from the second growing profile to the second plant growing unit so that the second plant growing unit can execute the second set of growing parameters to grow a second plant that is planted in the second plant growing unit;

receive second sensor data from the second plant growing unit indicative of data from one or more sensors locally installed at the second plant growing unit; and customize the second set of growing parameters based on the second sensor data from the second plant growing unit such that the second set of growing parameters is customized for a second environment that is different than the first environment, wherein the customizing of the second set of growing parameters optimizes the second growing profile for the second environment.

13. The non-transitory computer readable medium of claim 11, wherein the first set of growing parameters includes one or more of:

a mister setting for a mister installed at the first plant growing unit;

a fan setting for a fan installed at the first plant growing unit; and an illumination setting for an illumination source installed at the first plant growing unit.

14. The non-transitory computer readable medium of claim 11, wherein the first set of growing parameters includes first stage growing parameters related to a first growth stage of the plant and second stage growing parameters related to a second growth stage of the plant, wherein the first stage and second stage growing parameters are different.

15. The non-transitory computer readable medium of claim 11, wherein the first sensor data includes one or more of the following:

illumination data regarding natural illumination at the first plant growing unit;

temperature data regarding temperature at the first plant growing unit;

humidity data regarding humidity of the first plant growing unit; and water data regarding a water level at the first plant growing unit.

16. The computerized method of claim 1, wherein the seed cartridge includes one or more of a substrate layer, a structural layer, a growing medium layer, and a support layer.

17. The computing system of claim 6, wherein the seed cartridge includes one or more of a structural layer, a growing medium layer, and a support layer.

18. The non-transitory computer readable medium of claim 11, wherein the seed cartridge includes one or more of a substrate layer, a structural layer, a growing medium layer, and a support layer.

19. The computerized method of claim 1, wherein the seed cartridge includes a structural layer.

20. The computing system of claim 6, wherein the seed cartridge includes a structural layer.

* * * * *